(12) United States Patent
Kazawa

(10) Patent No.: US 6,301,033 B1
(45) Date of Patent: Oct. 9, 2001

(54) OPTICAL TRANSMISSION EQUIPMENT AND OPTICAL NETWORKS

(75) Inventor: Tohru Kazawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/872,973

(22) Filed: Jun. 11, 1997

(30) Foreign Application Priority Data

Jun. 14, 1996 (JP) .................................................. 8-154351

(51) Int. Cl.$^7$ .............................. H04J 14/08; H04J 14/02
(52) U.S. Cl. .................... 359/135; 359/135; 359/125; 359/126; 359/127; 359/123; 359/124
(58) Field of Search .................... 359/135, 124, 359/126, 127, 174, 152, 125

(56) References Cited

U.S. PATENT DOCUMENTS

| | | | | |
|---|---|---|---|---|
| 4,517,456 | * | 5/1985 | Halsall et al. | 250/226 |
| 4,549,782 | * | 10/1985 | Miller | 350/96.19 |
| 5,212,577 | * | 5/1993 | Nakamura et al. | 359/124 |
| 5,555,121 | * | 9/1996 | Dupont et al. | 359/180 |
| 5,602,665 | * | 2/1997 | Asako | 359/152 |
| 5,650,612 | * | 7/1997 | Criswell et al. | 250/226 |
| 5,699,177 | * | 12/1997 | Yamamoto | 359/125 |
| 5,717,510 | * | 2/1998 | Ishikawa et al. | 359/161 |
| 5,793,510 | * | 8/1998 | Samejima et al. | 359/158 |

FOREIGN PATENT DOCUMENTS

| | | | |
|---|---|---|---|
| 2 019 561 A | * | 10/1979 | (GB) . |
| 613490 | | 1/1986 | (JP) .................. H01S/3/18 |

OTHER PUBLICATIONS

T. Ido, et al, Tensile Strained InGaAs/InAlAs MQW Electroabsorption Modulators, Central Research Lab, Hitachi, Ltd., Technical Report of IEICP, 1993.

N. Keil, et al, 4×4 Polymer Thermo–Optic Directional Coupler Switch at 1.55$\mu$m, Electronics Letters, Apr. 14, 1994, vol. 30, No. 8.

M. Aoki, On–Wafer Wavelength Control of DFB lasers by selective area MOVPE and its Application, Central Research Lab, 1995.

H. Tanobe, Single–Current Continuous Wavelength Tuning in a Tunable Interdigital Electrode (TIE) DBR LD, NTT Opto–Electronics Laboratories, 1995.

* cited by examiner

Primary Examiner—Jason Chan
Assistant Examiner—M. R. Sedighian
(74) Attorney, Agent, or Firm—Sofer d Haroun, LLP

(57) ABSTRACT

An optical transmission equipment concatenating a combination of a plurality of optical emitters and a plurality of a optical detectors wherein the optical emitters are configured to send optical signals having different wavelengths. Furthermore, the optical detectors are configured to receive optical signals with different wavelengths. The optical emitters are concatenated serially on the same optical axis such that optical emitters with shorter wavelengths are respectively located closer to the receivers and the optical detectors are concatenated serially on the same optical axis such that optical receivers with shorter wavelengths are respectively located closer to the emitters. At least one of the emitted wavelengths or the detected wavelengths can be tuned electrically.

7 Claims, 7 Drawing Sheets

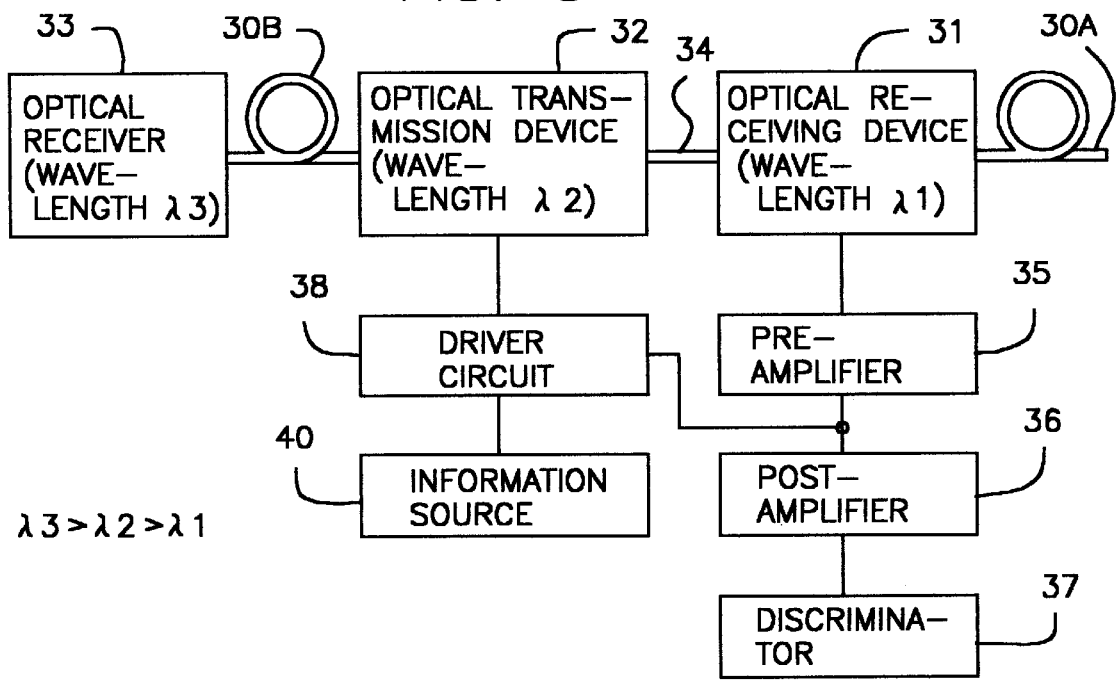
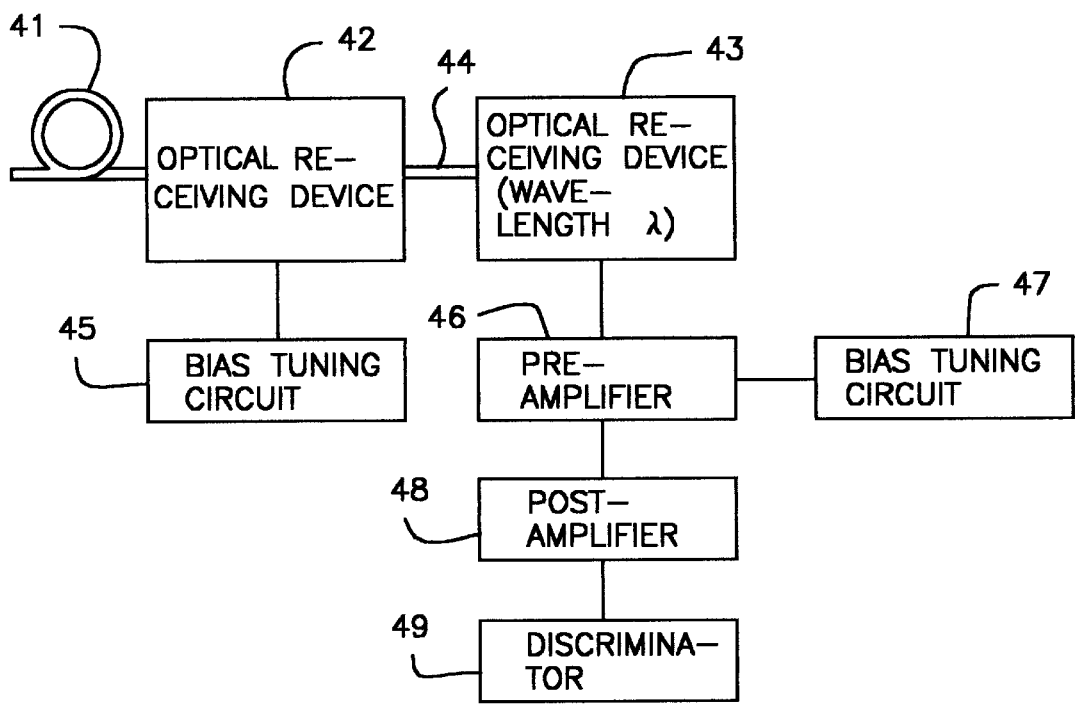

OPTICAL TRANSMISSION EQUIPMENT AND OPTICAL NETWORKS

BACKGROUND OF THE INVENTION

1. Field of the Invention

The present invention relates to an optical transmission equipment and an optical network and more particularly to a time division multiplexing or wavelength division multiplexing optical transmission equipment and optical network.

2. Prior Art

A conventional optical transmission equipment often has the constitution indicated below so as to transmit a wavelength division multiplexing optical signal by one optical fiber. Namely, the constitution is that when the number of wavelengths to be multiplexed is n, an optical splitting device for splitting the optical power into n parts is connected to the optical fiber, and an optical filter for passing only one wavelength is connected to the n-split output, and an optical sending or receiving device is connected to the end thereof. There is a case that a WDM device functioning as an optical splitting device and an optical filter is used. In either case, the equipment is characterized in that optical sending or receiving devices are arranged in parallel.

In an optical transmission equipment for sending or receiving signals in time division by one optical fiber using only one wavelength, a signal from the optical fiber is split into 2 parts by the optical splitting device and they are connected to the optical sending device and the optical receiving device respectively.

The aforementioned optical splitting device causes an optical power loss of at least 3 dB per split, so that the maximum launched power of the optical transmitter or the minimum received power of the optical receiver is degraded lower than the real power of the optical device. This degradation degree is particularly conspicuous when the number of splits of the optical splitting device is large, that is, the number of wavelengths to be multiplexed is large.

On the other hand, in the WDM device in which the optical splitting device and the optical filter are integrated, the optical loss is lower than that of the optical splitting device. However, the WDM device may cause an optical loss of a little less than 1 dB, so that the maximum launched power of the optical transmitter or the minimum received power of the optical receiver is also degraded lower than the real power of the optical device.

As against this, in the optical multiplexer/demultiplexer indicated in Japanese Patent Publication 6-32325, it is described that it has semiconductor light emission elements which are installed side by side on the optical axis of the optical fiber in the propagation direction of the light emitted by the emission part and the non-excited part in the number of frequencies to be multiplexed or demultiplexed, and the semiconductor optical emitting elements are arranged in the ascending order of emitted wavelengths of the emitting part, and the adjustment of the optical multiplexer/demultiplexer at the time of preparation can be simplified.

In the optical multiplexer/demultiplexer, without using a combination of the optical splitting device and the optical filter or the WDM device, light can be multiplexed and demultiplexed by use of the transparency/absorption characteristics depending on the wavelength of the semiconductor, and with respect to optical multiplexing, there is little optical loss, and with respect to optical demultiplexing, there is a defect remaining that an optical loss is caused due to light absorption in the active region while light is passing the active region. Furthermore, there is another defect that the wavelength usable for optical transmission depends on the manufacturing conditions of the semiconductor and is a fixed wavelength, so that the use of the optical multiplexer/demultiplexer is restricted to fixed two-way communication between two places.

With respect to a method of selecting and taking out one optional wavelength from a wavelength multiplexed signal, for example, a method of mechanically switching an optical filter transmitting a different wavelength and a method using temperature control described in "4×4 polymer thermo-optic directional coupler switch at 1.55 um" (Electronics Letters, Vol. 30, No. 8, 1994, pp 639–640) are known. However, the part volume is large, and the price is high, and switching requires a time in ms units at the fastest, so that there is a problem that the methods cannot be applied to high-speed signal switching. However, recently, as described in "Tensile Strained InGaAs/InAlAs MQW Electroabsorption Modulators" (Technical Report of the Institute of Electronic Information and Communication Engineers OQE-93-44), an art for changing the band gap by changing the applied voltage to the optical detector has been proposed.

With respect to an art for tuning an emitted wavelength, a means for changing the injection current to the emitting part and changing the refractive index which is described in "Single-Current Continuous Wavelength Tuning in a Tunable Interdigital Electrode (TIE) DBR LD" (Electro Society Convention of the Electronic Information and Communication Engineers, 1995, C-208) has been proposed.

In the aforementioned optical multiplexer/demultiplexer indicated in Japanese Patent Publication 6-32325, light can be multiplexed and demultiplexed by use of the transparency/absorption characteristics depending on the wavelength of the semiconductor. However, with respect to optical multiplexing, there is little optical loss and with respect to optical demultiplexing, there is a defect remaining that an optical loss is caused due to light absorption in the active region while light is passing the active region. Furthermore, there is another defect that the wavelength usable for optical transmission depends on the manufacturing conditions of the semiconductor and is a fixed wavelength, so that the use of the optical multiplexer/demultiplexer is restricted to fixed two-way communication between two places. To make up for this defect and execute two-way communication between many places, it is necessary to set a band gap in the semiconductor manufacturing process, so that there is a defect that since semiconductors cannot be produced in large quantities, the cost is increased.

In the aforementioned prior art, there is no special description on expansion of the number of wavelengths which is decided once in wavelength division multiplexing transmission and to expand it, it is necessary to replace the optical multiplexer/demultiplexer. However, if a user of the transmission system requests addition of the number of wavelengths in the future, it is necessary to correspond to it.

SUMMARY OF THE INVENTION

An object of the present invention is to provide an optical transmission equipment free of optical loss as mentioned above and an optical network.

Another object of the present invention is to eliminate the aforementioned defect that the equipment is expensive because semiconductors cannot be produced in large quantities and to provide an inexpensive optical transmission equipment and optical network.

Still another object of the present invention is to provide an optical transmission equipment which is excellent in expandability of a system in wavelength division multiplexing transmission and an optical network.

Means of Solving the Problems

In an optical transmission equipment for sending or receiving signals in time division using only one wavelength, by use of a constitution that an optical fiber, an optical transmission device, and an optical receiving device are arranged in this order on the same optical axis, the aforementioned first and second objects can be solved. For transmission of an optical signal, the optical transmission device emits light and the optical signal enters the optical fiber and optical receiving device. In this case, the optical receiving device can be used as a monitor element for the transmission optical power. On the other hand, for reception of an optical signal, when an appropriate bias voltage is applied to the optical transmission device, the band gap energy is expanded. The received optical signal emitted from the optical fiber passes the optical transmission device in which the band gap energy is expanded and enters the optical receiving device.

By adjusting the bias voltage applied to the optical transmission device, it is possible to make the optical transmission device operate as an optical amplifier and use it as a means for improving the minimum received power. In the same way, a method of arranging an optical fiber, an optical receiving device, and an optical transmission device in this order on the same optical axis is also possible. By doing this, optical receiving devices and optical transmission devices can be produced in large quantities and inexpensive optical transmission equipments and optical networks can be obtained.

The third object can be solved by using a constitution that at least two optical receiving devices which can tune the band gap energy are concatenated. In this case, the band gap energy of the first optical receiving device which is nearer to the optical fiber is adjusted so as to set it to a value which is larger than the band gap energy corresponding to the wavelength to be received and smaller than the band gap energy corresponding to light whose wavelength is shorter than the wavelength to be received which is included in the received light. By doing this, the first optical receiving device absorbs all lights having a wavelength shorter than the wavelength to be received and passes lights having a wavelength equal to and longer than the wavelength to be received. The band gap energy of the second optical receiving device which is farther from the optical fiber is adjusted so as to make it equal to the band gap energy corresponding to the wavelength to be received. By doing this, only an optical signal having the wavelength to be received can be received selectively from the second optical receiving device. The optical receiving device can tune the band gap energy, so that an optical transmission equipment and optical network which are excellent in expandability can be obtained using it.

According to the present invention, an optical transmission equipment and optical network having little optical loss can be provided. According to the present invention, an optical transmission equipment and optical network which are inexpensive can be provided. Furthermore, according to the present invention, an optical transmission equipment and optical network which are excellent in expandability of a system in wavelength division multiplexing transmission can be provided.

BRIEF DESCRIPTION OF THE DRAWINGS

FIG. 3 is a drawing showing the constitution of an optical transmission equipment for sending and receiving signals by one optical fiber which is shown in Embodiment 3 of the present invention.

FIG. 4 is a drawing showing the constitution of an optical tuner for selecting and receiving a signal with a wavelength from a wavelength multiplexed signal which is shown in Embodiment 4.

DETAILED DESCRIPTION OF THE PREFERRED EMBODIMENTS

Embodiments of the Invention

The embodiments of the present invention will be explained hereunder by referring to FIGS. 1 to 10.

Figure 6:
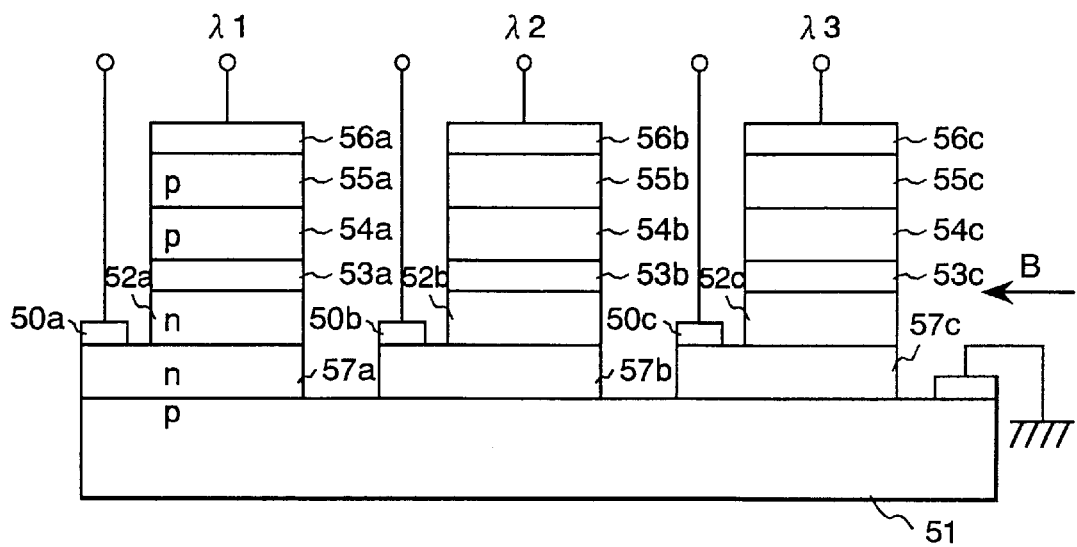
FIG. 6 is a drawing showing the constitution of an optical receiving device in which a plurality of optical devices having different wavelengths are integrated on a semiconductor substrate which is shown in Embodiment 6 of the present invention.
Figure 7:
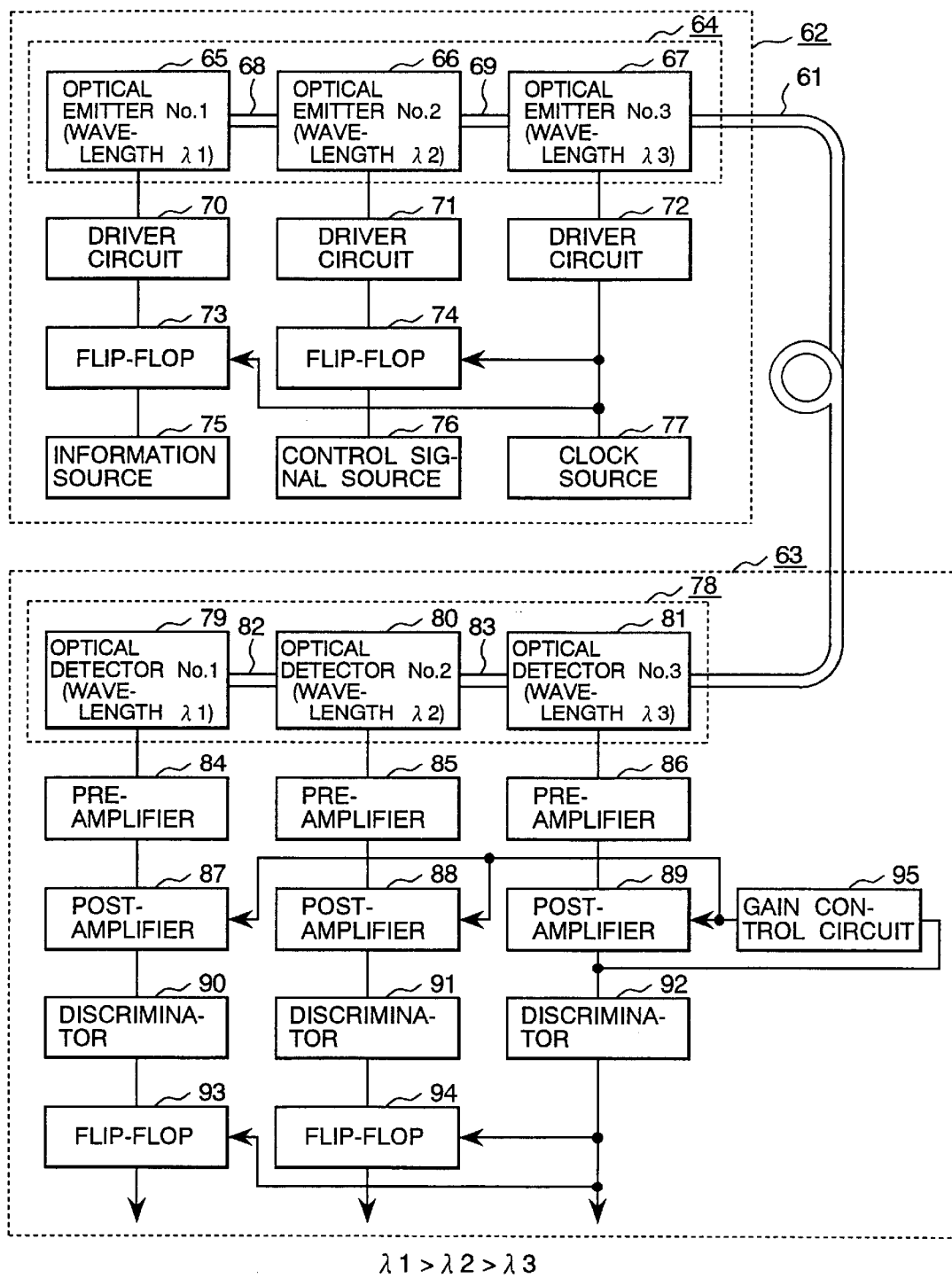
FIG. 7 is a drawing illustrating the constitution of an optical transmitter and an optical receiver used for an optical bus transmitting parallel signals by one optical fiber which is shown in Embodiment 7 of the present invention.
Figure 8:
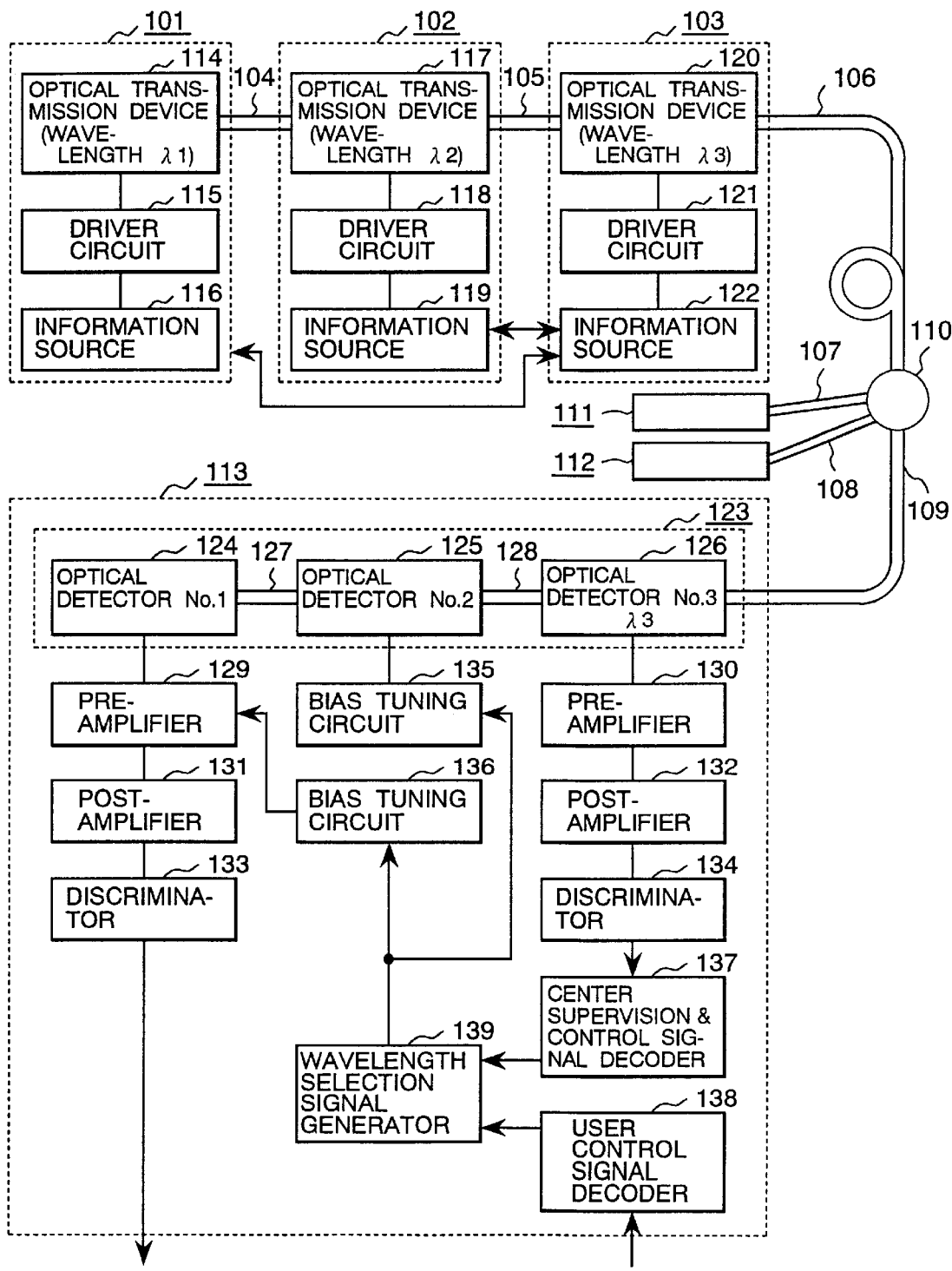
FIG. 8 is a drawing illustrating the constitution of a star type network using wavelength division multiplexing which is shown in Embodiment 8 of the present invention.
Figure 9:
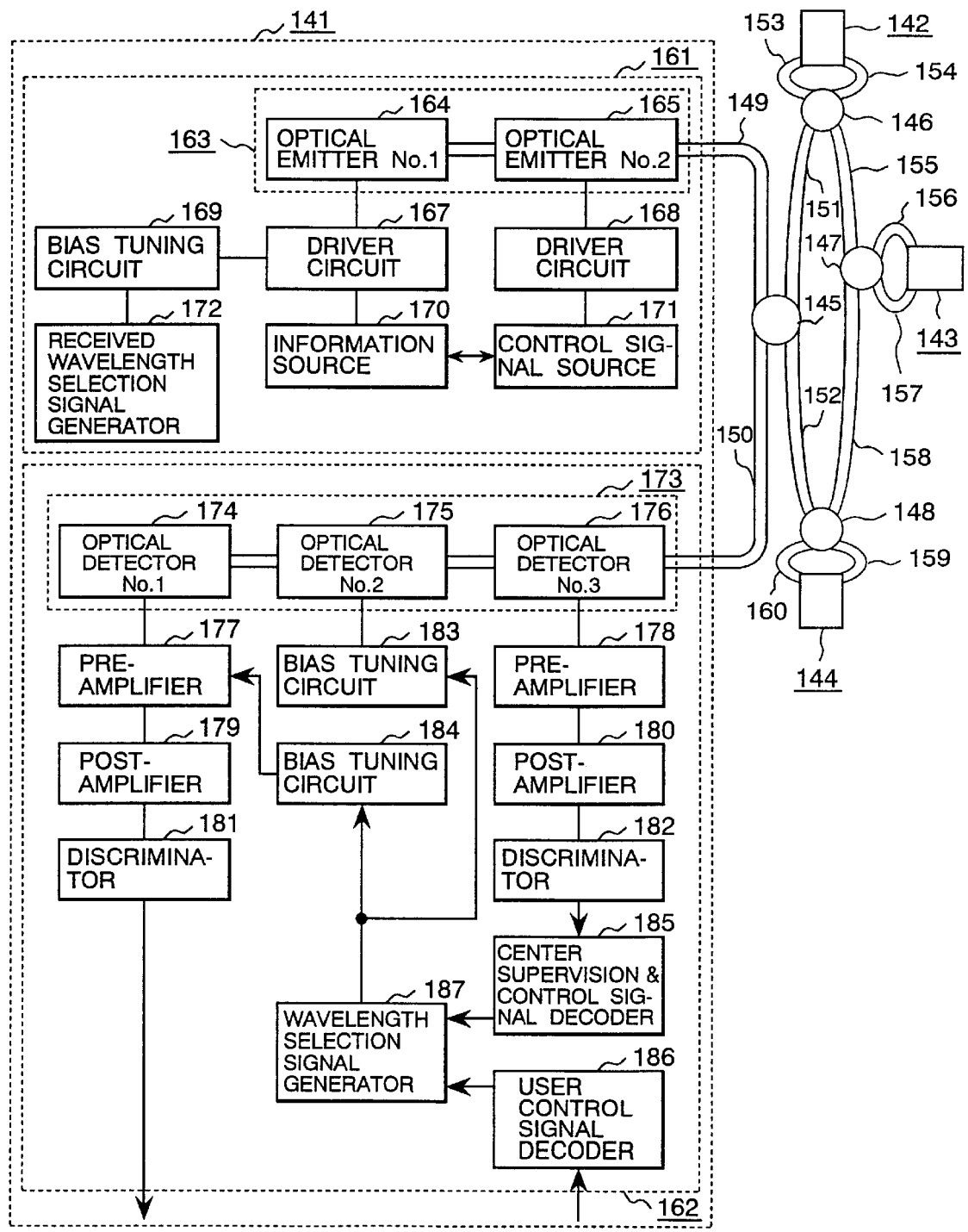
FIG. 9 is a drawing illustrating the constitution of a ring type network using wavelength division multiplexing which is shown in Embodiment 9 of the present invention.
Figure 10:
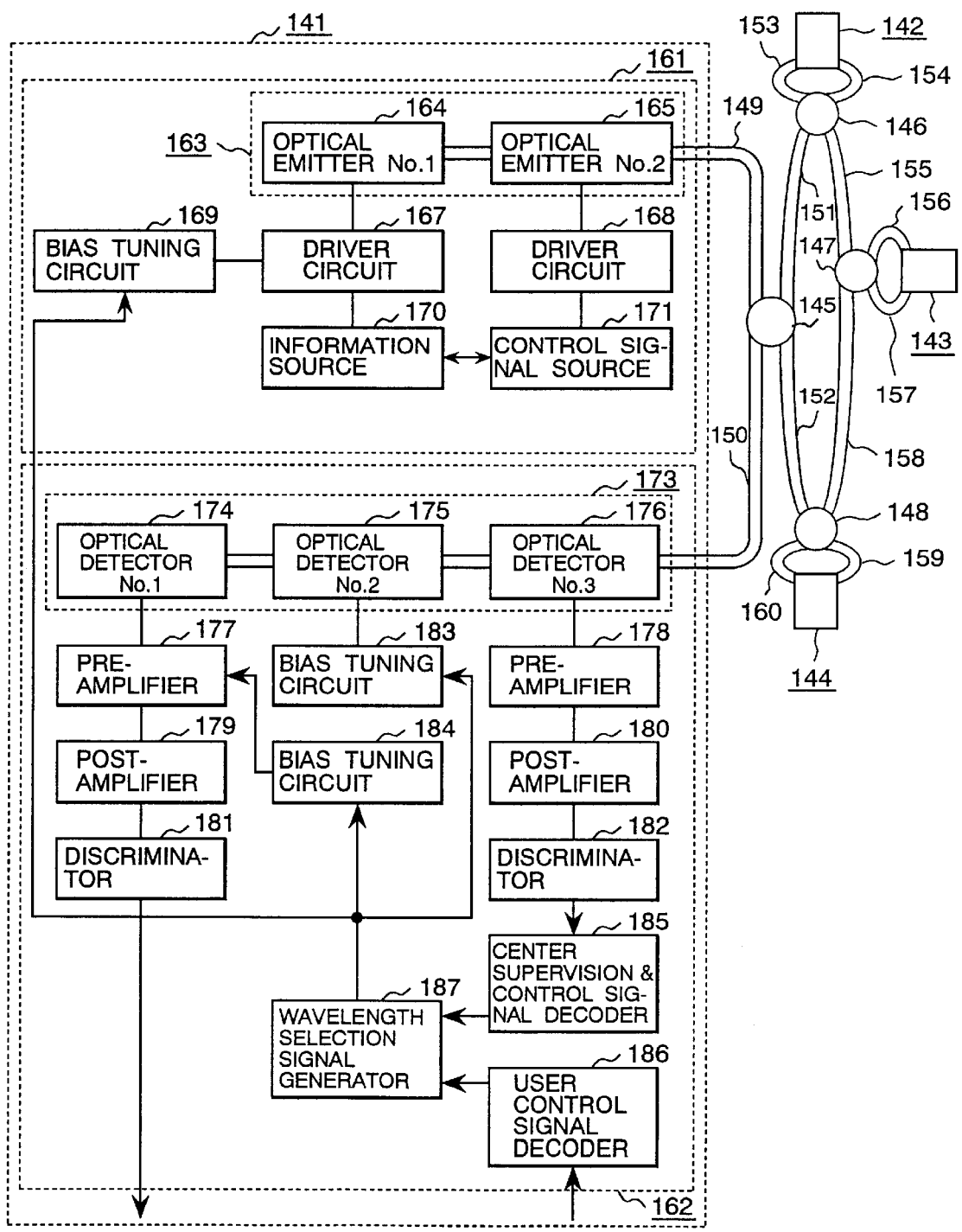
FIG. 10 is a drawing illustrating the constitution of a ring type network using wavelength division multiplexing which is shown in Embodiment 10 of the present invention.

The embodiments of the present invention shown in FIGS. 1 to 7 are optical transmission equipments and FIGS. 8 to 10 show optical networks which are other embodiments of the present invention.

Embodiment 1

Embodiment 1 shows the constitution of an optical transmission equipment for sending and receiving signals by one optical fiber.

This embodiment comprises an optical fiber 30a which is a transmission line, an optical fiber 30b, an optical receiving device 31, an optical transmission device 32, an optical receiver 33, an optical wave guide 34, a pre-amplifier 35, a post-amplifier 36, a discriminator 37, a driver circuit 38, a bias tuning circuit 39, and an information source 40. The optical fiber 30a, the optical transmission device 32, the optical wave guide 34, the optical receiving device 31, the optical fiber 30b, and the optical receiver 33 are arranged on the same optical axis.

The optical receiving device 31 and the optical transmission device 32 operate in time division and transmit and receive signals in the same wavelength λ1. The optical transmission device 32 can change the band gap by a bias voltage applied from the bias tuning circuit 39 via the driver circuit 38. This principle is the same as that of the aforementioned action for changing the wavelength by changing the applied voltage to the optical detector by the electric field absorption type modulator.

When the optical receiving device 31 receives a signal, a band gap for passing a wavelength of λ1 is given and when the optical transmission device 32 transmits a signal, a band gap for emitting a wavelength of λ1 is given. The optical receiver 33 is designed so as to receive a signal with a wavelength of λ2 which is longer than the wavelength λ1. For example, it is desirable to set the wavelength λ1 to a 1.3 micron wavelength band and the wavelength λ2 to a 5 micron wavelength band. When the optical receiving device 31 receives a signal, signals with a wavelength of λ1 and a wavelength of λ2 are multiplexed and sent from the optical fiber 30a. The signal with a wavelength of λ1 passes the optical transmission device 32 and the optical wave guide 34 and is absorbed and converted to an electric signal by the optical receiving device 31 and re-shaped by the pre-amplifier 35, the post-amplifier 36, and the discriminator 37. Therefore, only the signal with a wavelength of λ2 passes the optical transmission device 32, the optical wave guide 34, the optical receiving device 31, and the optical fiber 30b, arrives at the optical receiver 33, and is received by it.

When the optical transmission device 32 transmits a signal, a signal generated from the information source 40 is given to the optical transmission device 32 by the driver circuit 38 and a signal with a wavelength of λ1 is sent to both the optical fiber 30a and the optical wave guide 34. The light sent toward the optical wave guide 34 is absorbed and converted to an electric signal by the optical receiving device 31 and amplified by the pre-amplifier 35. The output current of the driver circuit 38 is controlled by the output voltage of the pre-amplifier 35 and the transmission optical power of the optical transmission device 32 is automatically controlled to be made fixed. In this case, the signal with a wavelength of λ2 passes the optical transmission device 32, the optical wave guide 34, the optical receiving device 31, and the optical fiber 30b, so that reception of the optical receiver 33 is not affected.

This embodiment shows an example that only a wavelength of λ1 is used as a transmission wavelength, while two wavelengths of λ1 and λ2 are used as a receiving wavelength. However, both transmission wavelength and receiving wavelength may be only a wavelength of λ1. In this case, the optical receiver 33 is not necessary.

According to this embodiment, when the optical transmission equipment is sending a signal, a band gap for emitting a wavelength of 1 is given as a band gap of the optical transmission device 32 and when the optical transmission equipment is receiving a signal, a band gap for passing a wavelength of λ1 is given as band gap of the optical transmission device 32 near to the optical fiber 30a which is a transmission line from the optical receiving device 31. Therefore, an effect of no optical loss is obtained. This embodiment produces an effect that a signal sent from the optical transmission device 32 is monitored by the optical receiving device 31 and can be controlled to a fixed output.

Embodiment 2

Embodiment 2 of the present invention will be explained by referring to FIG. 2.

Embodiment 2 shows the constitution of another optical transmission equipment for sending and receiving signals by one optical fiber.

Figure 1:
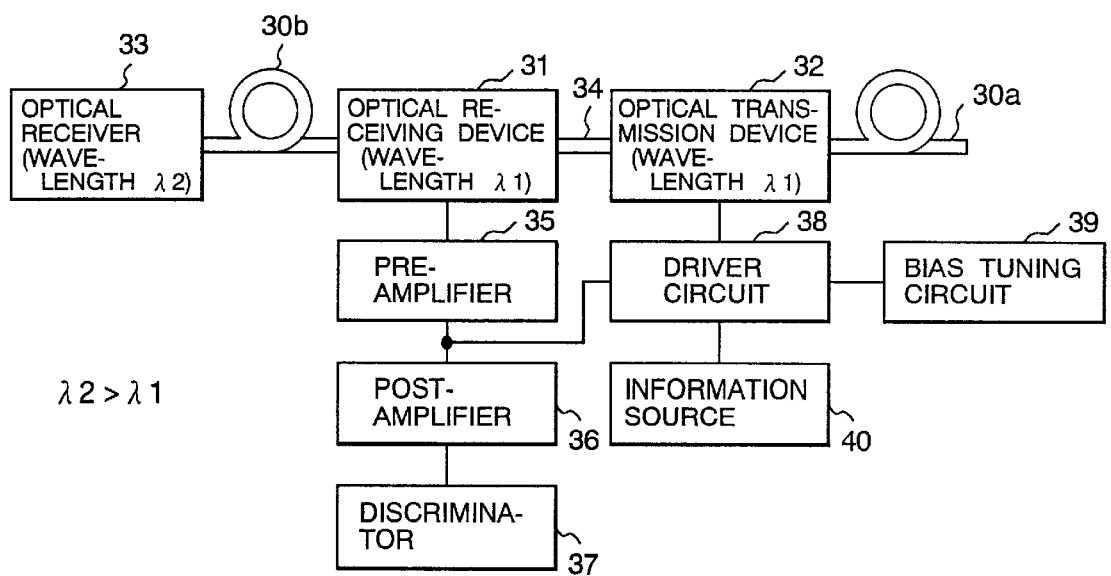
FIG. 1 is a drawing showing the constitution of an optical transmission equipment for sending and receiving signals by one optical fiber which is shown in Embodiment 1 of the present invention.
Figure 2:
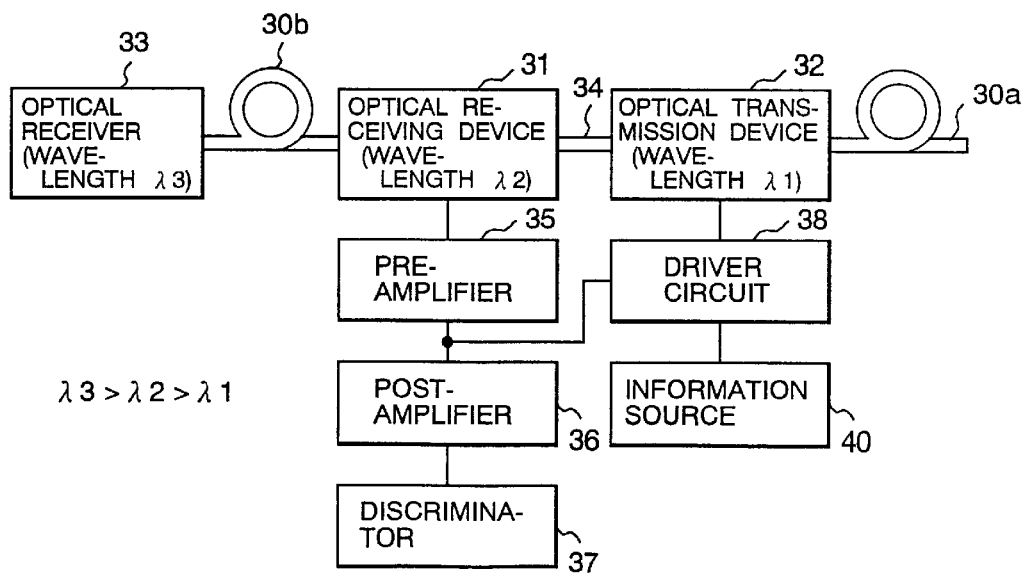
FIG. 2 is a drawing showing the constitution of an optical transmission equipment for sending and receiving signals by one optical fiber which is shown in Embodiment 2 of the present invention.

The constitution shown in FIG. 2 is a constitution that only the bias tuning circuit is removed from FIG. 1 and an example that the optical receiving device 31 and the optical transmission device 32 are operated in different wavelengths is shown.

This embodiment comprises an optical fiber 30a which is a transmission line, an optical fiber 30b, an optical receiving device 31, an optical transmission device 32, an optical receiver 33, an optical wave guide 34, a pre-amplifier 35, a post-amplifier 36, a discriminator 37, a driver circuit 38, and an information source 40. The optical fiber 30a, the optical transmission device 32, the optical wave guide 34, the optical receiving device 31, the optical fiber 30b, and the optical receiver 33 are arranged on the same optical axis.

In a transmitter and receiver for allowing the optical transmission device 32 to send a signal with a wavelength of λ1 and the optical receiving device 31 to receive a signal with a wavelength of 2 which is longer than λ1, the wavelength λ2 passes the optical transmission device 32, so that reception of the aoptical receiving device 31 is not affected. A signal with a wavelength λ3 which is longer than the wavelengths λ1 and λ2 passes the optical receiving device 31 and the optical transmission device 32, so that the optical receiver 33 receives the signal with a wavelength of 3.

In this embodiment, there is no need to share the transmission time for one wavelength with transmission and reception, so that the transmission capacity can be increased. Furthermore, there is no need to control the band gap of the optical device dynamically, so that there is an advantage that the circuit can be simplified.

Embodiment 3

Embodiment 3 of the present invention will be explained by referring to FIG. 3.

Embodiment 3 shows the constitution of another optical transmission equipment for sending and receiving signals by one optical fiber.

The constitution shown in FIG. 3 is a constitution that the order of the optical transmission device and the optical receiving device is reversed and an example that the optical receiving device 31 and the optical transmission device 32 are operated in different wavelengths is shown.

This embodiment comprises an optical fiber 30a which is a transmission line, an optical fiber 30b, an optical receiving device 31, an optical transmission device 32, an optical receiver 33, an optical wave guide 34, a pre-amplifier 35, a post-amplifier 36, a discriminator 37, a driver circuit 38, and an information source 40. The optical fiber 30a, the optical receiving device 31, the optical wave guide 34, the optical transmission device 32, the optical fiber 30b, and the optical receiver 33 are arranged on the same optical axis.

The optical transmission device 32 sends a signal with a wavelength of λ2 and the optical receiving device 31 receives a signal with a wavelength of λ1 which is shorter than λ2. In an optical transmission equipment having this constitution, the wavelength λ2 passes the optical receiving device 31, so that transmission of the optical transmission device 32 is not affected. A signal with a wavelength λ3 which is longer than the wavelengths λ1 and λ2 passes the optical receiving device 31 and the optical transmission device 32, so that the optical receiver 33 receives the signal with a wavelength of 3.

In this embodiment, there is no need to share the transmission time for one wavelength with transmission and reception, so that the transmission capacity can be increased. Furthermore, there is no need to control the band gap of the optical device dynamically, so that there is an advantage that the circuit can be simplified.

Embodiment 4

Next, Embodiment 4 of the present invention will be explained by referring to FIG. 4. Embodiment 4 shows the constitution of an optical tuner for selecting and receiving a signal with a wavelength from a wavelength multiplexed signal.

This embodiment comprises an optical fiber 41, optical receiving devices 42 and 43, an optical wave guide 44, bias tuning circuits 45 and 47, a pre-amplifier 46, a post-amplifier 48, and a discriminator 49.

A case that the equipment receives a signal with a wavelength of $\lambda$ will be explained hereunder. A signal with a plurality of wavelengths multiplexed is received via the optical fiber 41 and inputted to the optical receiving device 42. The bias tuning circuit 45 applies a bias voltage so that the optical receiving device 42 has a band gap for absorbing a wavelength shorter than the wavelength $\lambda$. Therefore, wavelengths shorter than the wavelength $\lambda$ are absorbed by the optical receiving device 42 and lights with a wavelength of and wavelengths longer than $\lambda$ are inputted to the optical receiving device 43 via the optical wave guide 44. The bias tuning circuit 45 applies a bias voltage so that the optical receiving device 43 has a band gap for passing a light with a wavelength longer than the wavelength $\lambda$. Therefore, wavelengths longer than the wavelength $\lambda$ pass the optical receiving device 43 and only the wavelength is absorbed and converted to an electric signal by the optical receiving device 43. The pre-amplifier 46, the post-amplifier 48, and the discriminator 49 re-shape the converted electric signal.

According to this embodiment, a received wavelength can be controlled externally by the same component unit and same component units can be produced in large quantities, so that a low-priced optical transmission equipment can be obtained.

When the constitution shown in FIG. 4 is expanded, signals with a plurality of wavelengths can be selected and received from a wavelength multiplexed signal at the same time. When a combination of the optical receiving device 43, the bias tuning circuit 47, the pre-amplifier 46, the post-amplifier 48, and the discriminator 49 is prepared for the number of wavelengths to be selected at the same time and the optical receiving devices 42 are concatenated, lights can be received in the ascending order of wavelengths from the optical receiving devices 42 in the ascending order of distances from the optical fiber 41 which is an optical transmission line.

According to this expanded embodiment, when the same component units are connected in a string, signals with a plurality of wavelengths can be selected and received from a wavelength multiplexed signal at the same time. Same component units can be produced in large quantities, so that a low-priced optical transmission equipment can be obtained.

Embodiment 5

Next, Embodiment 5 of the present invention will be explained by referring to FIG. 5.

Embodiment 5 shows the constitution of an optical transmission device in which a plurality of optical devices having different wavelengths are integrated on a semiconductor substrate. FIG. 5 shows a cross sectional view of the optical transmission device which is cut in parallel with the optical axis.

This embodiment comprises an n-injection layer 57 formed on a semiconductor substrate 51, a lower electrode 50, an n-cladding layer 52, an active layer 53, a p-cladding layer 54, a p-injection layer 55, and an upper electrode 56.

The active layer 53 comprising an active layer No. 1 53a, an active layer No. 2 53b, and an active layer No. 3 53c is equivalent to an optical emitter and the applied voltage between the lower electrode 50 and the upper electrode 56 is changed for each optical emitter so that a wavelength of $\lambda 1$, a wavelength of $\lambda 2$, and a wavelength $\lambda 3$ which are respective emitted wavelengths are set as wavelength $\lambda 1$>wavelength $\lambda 2$>wavelength $\lambda 3$.

The active layer No. 1 53a emits light in a wavelength of $\lambda 1$ by a current supplied from an upper electrode No. 1 56a via a p-injection layer No. 1 55a, a p-cladding layer No. 1 54a, the active layer No. 1 53a, an n-cladding layer 52a, an n-injection layer 57a, and a lower electrode 50a and the light confined by the p-cladding layer No. 1 54a and the n-cladding layer 52a is propagated in the horizontal direction indicated by the arrow A and sent through an active layer No. 2 53b and an active layer No. 3 53c. In the same way, the active layer No. 2 53b emits light in a wavelength of $\lambda 2$ by a current supplied from an upper electrode No. 2 56b via a p-injection layer No. 2 55b, a p-cladding layer No. 2 54b, the active layer No. 2 53b, an n-cladding layer 52b, an n-injection layer 57b, and a lower electrode 50b and the light confined by the p-cladding layer No. 2 54b and the n-cladding layer 52b is propagated in the horizontal direction and sent through the active layer No. 3 53c. Furthermore, in the same way, the active layer No. 3 53c emits light in a wavelength of $\lambda 3$ by a current supplied from an upper electrode No. 3 56c via a p-injection layer No. 3 55c, a p-cladding layer No. 3 54c, the active layer No. 3 53c, an n-cladding layer 52c, an n-injection layer 57c, and a lower electrode 50c and the light confined by the p-cladding layer No. 3 54c and the n-cladding layer 52 is sent in the horizontal direction.

According to this embodiment, when a plurality of optical emitters are formed on one semiconductor substrate 51, the optical axes can be aligned and hence a special process of aligning the optical axes is not required, so that an optical transmission equipment and an optical network which are inexpensive can be obtained.

Embodiment 6

Next, Embodiment 6 of the present invention will be explained by referring to FIG. 6. Embodiment 6 shows the constitution of an optical receiving device in which a plurality of optical devices having different wavelengths are integrated on a semiconductor substrate. FIG. 6 shows a cross sectional view of the optical receiving device which is cut in parallel with the optical axis.

Figure 5:
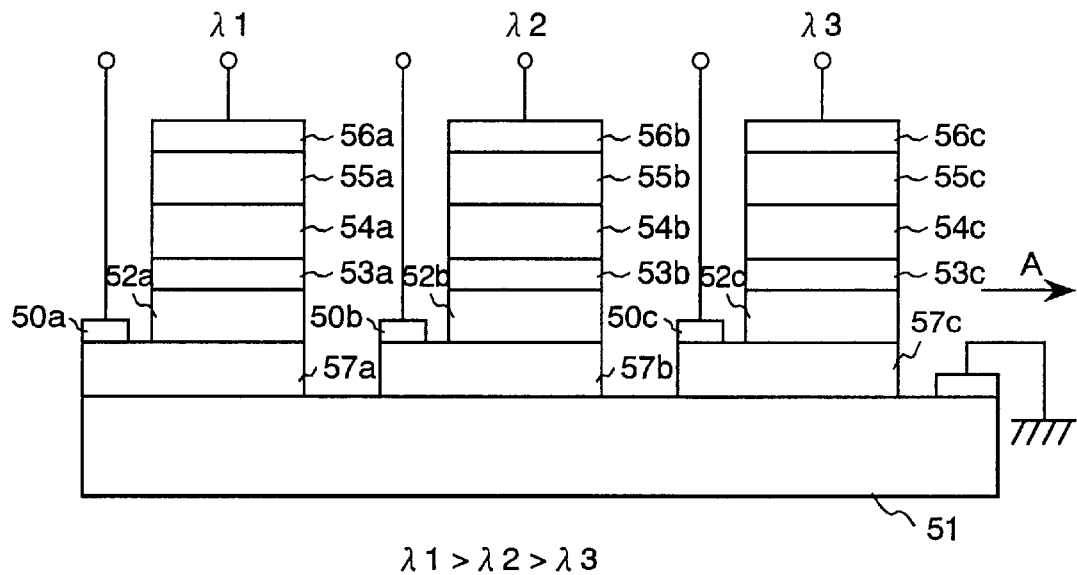
FIG. 5 is a drawing showing the constitution of an optical transmission device in which a plurality of optical devices having different wavelengths are integrated on a semiconductor substrate which is shown in Embodiment 5 of the present invention.

The constitution of this embodiment is exactly the same as that of the optical transmission device shown in FIG. 5 and the embodiment comprises an n-injection layer 57 formed on a semiconductor substrate 51, a lower electrode 50, an n-cladding layer 52, an active layer 53, a p-cladding layer 54, a p-injection layer 55, and an upper electrode 56.

The active layer 53 comprising an active layer No. 1 53a, an active layer No. 2 53b, and an active layer No. 3 53c is equivalent to an optical detector and the applied voltage between the lower electrode 50 and the upper electrode 56 is changed for each optical detector so that a wavelength of λ1, a wavelength of λ2, and a wavelength λ3 which are respective detected wavelengths are set as wavelength λ1>wavelength λ2>wavelength λ3.

When an appropriate voltage is set between a lower electrode No. 3 50c and an upper electrode No. 3 56c, the active layer No. 3 53c detects light with a wavelength of λ3, generates a detected current from the upper electrode No. 3 56c via a p-injection layer No. 3 55c, a p-cladding layer No. 3 54c, the active layer No. 3 53c, an n-cladding layer 52c, an n-injection layer 57c, and the lower electrode No. 3 50c, and propagates the light confined by the p-cladding layer No. 3 54c and the n-cladding layer 52c in the direction of the arrow B. In the same way, when an appropriate voltage is set between a lower electrode No. 3 50b and an upper electrode No. 3 56b, the active layer No. 2 53b detects light with a wavelength of λ2, generates a detected current from the upper electrode No. 2 56b via a p-injection layer No. 2 55b, a p-cladding layer No. 2 54b, the active layer No. 2 53b, an n-cladding layer 52b, an n-injection layer 57b, and the lower electrode No. 3 50, and propagates the light confined by a p-cladding layer No. 2 54b and an n-cladding layer 52b in the direction of the arrow B. Furthermore, in the same way, when an appropriate voltage is set between a lower electrode No. 1 50a and an upper electrode No. 3 56a, the active layer No. 3 53a detects light with a wavelength of λ1 and generates a detected current from the upper electrode No. 3 56a via a p-injection layer No. 3 55a, a p-cladding layer No. 3 54a, the active layer No. 3 53a, an n-cladding layer 52a, an n-injection layer 57a, and the lower electrode No. 3 50a.

When a plurality of optical emitters are formed on one semiconductor substrate 51 as mentioned above, the optical axes can be aligned and hence a special process of aligning the optical axes is not required, so that an optical transmission equipment and an optical network which are inexpensive can be obtained.

Embodiment 7

Embodiment 7 of the present invention will be explained by referring to FIG. 7.

Embodiment 7 shows the constitution of an optical transmitter and an optical receiver used for an optical bus for transmitting parallel signals by one optical fiber. This embodiment comprises an optical fiber 61, an optical transmitter 62, and an optical receiver 63.

The optical transmitter 62 comprises an optical transmission device 64, driver circuits 70, 71, and 72, flip-flops 73 and 74, an information source 76, and a clock source 77. In this case, the optical transmission device 64 comprises an optical emitter No. 1 65, an optical emitter No. 2 66, an optical emitter No. 3 67, and optical wave guides 68 and 69. The optical receiver 63 comprises an optical receiving device 78, pre-amplifiers 84, 85, and 86, post-amplifiers 87, 88, and 89, discriminators 90, 91, and 92, flip-flops 93 and 94, and a gain control circuit 95. In this case, the optical receiving device 78 comprises an optical detector No. 1 79, an optical detector No. 2 80, an optical detector No. 3 81, and optical wave guides 82 and 83.

The one-chip wavelength division multiplexing device which is explained in FIGS. 5 and 6 can be applied to the optical transmission device 64 and the optical receiving device 78.

A signal generated from the information source 75 and the control signal source 76 is synchronized with a system clock generate from the clock source 77 in the flip-flops 73 and 74 and passes a current through the optical emitter No. 1 65, the optical emitter No. 2 66, and the optical emitter No. 3 67 respectively via the driver circuits 70, 71, and 72. The optical emitter No. 1 65, the optical emitter No. 2 66, and the optical emitter No. 3 67 emit lights with a wavelength of λ1, a wavelength of λ2, and a wavelength of λ3 respectively and a relationship that the wavelengths are longer in the order of wavelength λ1, wavelength λ2, and wavelength λ3 is established. The signals with three wavelengths are multiplexed in this way and sent to the optical fiber 61. On the other hand, a signal transmitted through the optical fiber 61 is inputted to the optical receiver 63.

The signals with a wavelength of λ1, a wavelength of λ2, and a wavelength of λ3 are converted to electric signals by the optical detector No. 1 79, the optical detector No. 2 80, and the optical detector No. 3 81 respectively. The signals are re-shaped in waveform thereafter by the pre-amplifiers 84, 85, and 86, the post-amplifiers 87, 88, and 89, and the discriminators 90, 91, and 92. The outputs of the discriminators 90 and 91 are launched by and synchronized with the system clock which is an output of the discriminator 92 in the flip-flops 93 and 94. In this case, the gain control circuit 95 controls the gains of the post-amplifiers 87, 88, and 89 so that the output of the post-amplifier 89 for amplifying the clock becomes constant.

The clock always repeats the levels 1 and 0 and there is no risk of continuous occurrence of the same code, so that it is easy to detect the amplitude and keep the detected voltage. Therefore, by controlling the gains of the post-amplifiers on the basis of the amplitude of the received signal with the wavelength for transmitting the clock, it can be realized stably by a simple circuit even under high-speed control.

This embodiment has an advantage that amplitude detection and detected voltage keeping can be executed easily and realized stably by a simple circuit even under high-speed control.

Further multiplexing of signals of a plurality of information sources can be realized by providing a plurality of driver circuits 70, flip-flops 73;

optical emitters No. 1 65, optical detectors No. 1 79, pre-amplifiers 84, post-amplifiers 87, discriminators 90, and flip-flops 93.

Furthermore, a plurality of signals such as data, a control signal, a system clock, etc. can be transmitted by one optical fiber, so that wiring can be simplified substantially. In addition to it, as compared with a method of time division multiplexing of a plurality of signals at a high-speed clock, the equipment can be realized at a low price because no high speed clock is necessary.

Embodiment 8

Embodiment 8 of the present invention will be explained by referring to FIG. 8. FIG. 8 is a drawing illustrating the constitution of a star type network using wavelength division multiplexing.

This embodiment comprises optical transmitters 101, 102, and 103, optical fibers 104, 105, 106, 107, 108, and 109, a start coupler 110, and optical receivers 111, 112, and 113.

The optical transmitter 101 comprises an optical transmission device 114, a driver circuit 115, and an information source 116 and the optical transmitters 102 and 103 have the same constitution.

The optical receiver 113 comprises an optical receiving device 123, pre-amplifiers 129 and 130, post-amplifiers 131 and 132, discriminators 133 and 134, bias tuning circuits 135 and 136, a center supervision & control signal decoder 137, a user control signal decoder 138, and a wavelength selection signal generator 139. In this case, the optical receiving device 123 comprises an optical detector No. 1 124, an optical detector No. 2 125, an optical detector No. 3 126, and optical wave guides 127 and 128.

Signals of the information sources 116, 119, and 122 are given to the optical receiving devices 114, 117, and 120 via the driver circuits 115, 118, and 121 respectively and sent in a wavelength of λ1, a wavelength of λ2, and a wavelength of λ3 respectively. Namely, the wavelengths are multiplexed in the order of the optical transmitters 101, 102, and 103 and a 3-wavelength multiplexed signal is generated. In this case, a relationship of wavelength λ1>wavelength λ2>wavelength λ3 is established. The wavelength multiplexed signal is transmitted through the optical fiber 106, branched to a plurality of parts by the star coupler 110, and transmitted up to the optical receivers 111, 112, and 113 via the optical fibers 107, 108, and 109.The operation of the optical receiver 113 will be explained hereunder on behalf of the optical receivers. The wavelength multiplexed signal is inputted to the optical receiving device 123. The one-chip wavelength division multiplexing device which is explained in FIG. 6 can be applied to the optical receiving device 123. The band gap of the optical detector No. 3 126 is set so as to always absorb the wavelength λ3 and pass the wavelengths λ2 and λ3.

When a user desires to receive a service of the wavelength λ1, an instruction of the user is given to the user control signal decoder 138 and information of the wavelength λ1 corresponding to the service is extracted and transferred to the wavelength selection signal generator 139. The wavelength selection signal generator 139 controls the bias tuning circuit 135 and sets the band gap of the optical detector No. 2 125 so as to absorb the wavelength λ2 and pass the wavelength λ1. Furthermore, the wavelength selection signal generator 139 controls the bias tuning circuit 136 and sets the band gap of the optical detector No. 1 124 so as to absorb the wavelength λ1. The signal with a wavelength of λ1 absorbed by the optical detector No. 1 124 is converted to an electric signal, re-shaped in waveform by the pre-amplifier 129, the post-amplifier 131, and the discriminator 133, and then offered to the user.

Even if the signal with a wavelength of λ3 is not required directly by the user, it is re-shaped in waveform by the pre-amplifier 130, the post-amplifier 132, and the discriminator 134 as a signal channel for supervision and control and then sent to the center supervision & control signal decoder 137. When information λ2 to be sent to the optical receiver 113 occurs in the optical transmitter 102 thereafter, a connection request (the arrow C) with the optical receiver 113 is notified to the information source 122 from the information source 119 and the information source 122 notifies a reception request of a wavelength of λ2 to the optical receiver 113 using a wavelength of λ3. The signal with a wavelength of λ3 is converted to an electric signal by the optical detector No. 3 126, re-shaped in waveform by the pre-amplifier 130, the post-amplifier 132, and the discriminator 134, and then sent to the center supervision & control signal decoder 137, so that the reception request of a wavelength of λ2 is transferred to the center supervision & control signal decoder 137. The reception request of a wavelength of λ2 from the center supervision & control signal decoder 137 and the reception request of a wavelength of λ1 from the user control signal decoder 138 are compared in priority by the wavelength selection signal generator 139. When the priority of the wavelength λ2 is higher, the wavelength selection signal generator 139 controls the bias tuning circuit 135 and sets the band gap of the optical detector No. 2 125 so as to pass the wavelengths λ2 and λ1. The wavelength selection signal generator 139 controls the bias tuning circuit 136 and sets the band gap of the optical detector No. 1 124 so as to absorb the wavelength λ2 and pass λ1. The signal with a wavelength of λ2 absorbed by the optical detector No. 1 124 is converted to an electric signal, re-shaped in waveform by the pre-amplifier 129, the post-amplifier 131, and the discriminator 133, and then offered to the user.

According to this embodiment, even if receiving devices are not provided for the number of wavelengths, a plurality of wavelengths can be selected and received, so that the embodiment is economical. If many wavelengths are used, the service can be provided with a most suitable signal format for each wavelength and the analog signal format or the digital signal format can be selected freely. Moreover, a new wavelength transmission service can be added only by concatenating a transmission equipment with an optical fiber, so that service expansion and coexistence of a multi-provider are made easy and the embodiment is excellent in flexibility. Furthermore, many services are not packed into one wavelength and the signal band per each wavelength can be suppressed to a small one, so that long distance transmission can be made possible by restricting the band of a receiver and increasing the sensitivity.In this embodiment, an example that the wavelength λ3 which is shortest among the wavelength multiplexed signals is used as a control signal is explained. When the shortest wavelength is used, three optical detectors are enough and the number of necessary optical detectors is least. There is a realization method using the longest wavelength inversely. In this case, the optical receiving device 123 has four optical detectors, and the optical detector nearest to the reception end absorbs a wavelength shorter than the selected wavelength, and the second nearest optical detector absorbs the selected wavelength, and the third nearest optical detector absorbs a wavelength shorter than the control wavelength, and the fourth nearest optical detector absorbs the control wavelength. The control wavelength is a longest wavelength, so that it passes all the optical detectors on the way.

If the control wavelength is neither longest nor shortest, six optical detectors are necessary in total, such as two to select a wavelength shorter than the control wavelength, two to receive only the control wavelength, and two to select a wavelength longer than. the control wavelength.

Embodiment 9

Embodiment 9 of the present invention will be explained by referring to FIG. 9.

FIG. 9 is a drawing illustrating the constitution of a ring type network using wavelength division multiplexing.

This embodiment comprises terminals 141, 142, 143, and 144, optical couplers 145, 146, 147, and 148, and optical fibers 149, 150, 151, 152, 153, 154, 155, 156, 157, 158, 159, and 160.

The terminal 141 comprises a transmitter 161 and a receiver 162, and furthermore, the transmitter 161 comprises an optical transmission device 163, driver circuits 167 and 168, a bias tuning circuit 169, an information source 170, a control signal source 171, and a transmitted wavelength selection signal generator 172, and the receiver 162 comprises an optical receiving device 173, pre-amplifiers 177 and 178, post-amplifiers 179 and 180, discriminators 181 and 182, bias tuning circuits 183 and 184, a center supervision & control signal decoder 185, a user control signal decoder 186, and a received wavelength selection signal generator 187. The optical receiving device 163 comprises an optical emitter No. 1 164 and an optical emitter No. 2 165 and the optical receiving device 173 comprises an optical detector No. 1 174, an optical detector No. 2 175, and an optical detector No. 3 176.

Firstly, the operation that the terminal 141 sends a signal to the terminal 143 will be explained. The wavelength of a signal to be sent from each terminal is decided fixedly in correspondence to an identification number at the point of time when the identification number is given to the terminal. The transmitted wavelength of the terminal 141 is assumed as $\lambda 2$ hereunder for explanation. The bias tuning circuit 169 applies a bias voltage via the driver circuit 167 so that the optical emitter No. 1 164 has a band gap with a wavelength of $\lambda 2$. A signal of the information source 170 is given to the optical emitter No. 1 164 from the driver circuit 167 and a signal with a wavelength of $\lambda 2$ is sent. At the same time, the control signal source 171 generates, for example, the identification number of the terminal 143 and a reception request signal with a wavelength of $\lambda 2$ and gives them to the optical emitter No. 2 165 from the driver circuit 168. The optical emitter No. 2 165 sends a signal with a wavelength of $\lambda 1$ which is shorter than the information signal transmitted wavelengths of all the terminals in the network. Therefore, the optical transmitter 141 multiplexes the signals with wavelengths of $\lambda 1$ and $\lambda 2$ and sends them to the optical fiber 149.

The signals are propagated to the optical fibers 151, 155, 158, and 152 sequentially via the optical coupler 145 and go round the ring network. At the same time, the signals are transmitted to the terminals 142, 143, 144, and 141 respectively via the optical coupler 146 and the optical fiber 153, the optical coupler 147 and the optical fiber 156, the optical coupler 148 and the optical fiber 159, and the optical coupler 145 and the optical fiber 150. The terminals 142, 143, 144, and 141 decode the contents of the signal with a wavelength of $\lambda 1$ respectively and only the terminal 143 discovers its own identification number, so that the terminal 143 tunes to the wavelength $\lambda 2$ according to the reception request of the wavelength $\lambda 2$ and receives the signal.

Next, the operation that the terminal 141 receives a signal from the terminal 143 will be explained. The terminal 143 sends a signal with the wavelength which is decided fixedly from its own identification number. Hereinafter, this wavelength is defined as $\lambda 3$. At the same time, the terminal 143 sends the identification number of the terminal 141 and a reception request signal with a wavelength of $\lambda 3$ to the optical fiber 157 using the wavelength $\lambda 1$. The signals are propagated to the optical fibers 158, 152, 151, and 155 sequentially via the optical coupler 147 and go round the ring network. At the same time, the signals are transmitted to the terminals 144, 141, 142, and 143 respectively via the optical coupler 148 and the optical fiber 159, the optical coupler 145 and the optical fiber 150, the optical coupler 146 and the optical fiber 153, and the optical coupler 147 and the optical fiber 156. The signal received by the receiver 162 of the terminal 141 is inputted to the optical receiving device 173. The optical detector No. 3 176 is provided with a band gap so as to absorb lights with all wavelengths which are shorter than the wavelength $\lambda 1$. Therefore, only the signal with a wavelength of $\lambda 1$ is converted to an electric signal by the optical detector No. 3 176, re-shaped in waveform by the pre-amplifier 178, the post-amplifier 180, and the discriminator 182, and then sent to the center supervision & control signal decoder 185. The center supervision & control signal decoder 185 discovers the identification number of the terminal 141 and the reception request signal with a wavelength of $\lambda 3$ in the signal. Then, the received wavelength selection signal generator 187 controls the bias tuning circuit 183 and gives a band gap to the optical detector No. 2 175 so as to absorb lights with all wavelengths which are shorter than the wavelength $\lambda 3$ and pass the wavelength $\lambda 3$. At the same time, the received wavelength selection signal generator 187 controls the bias tuning circuit 184 and gives a band gap to the optical detector No. 1 174 so as to absorb the wavelength $\lambda 3$ and pass lights with wavelengths which are longer that it. In this way, only the signal with a wavelength of $\lambda 3$ is converted to an electric signal by the optical detector No. 1 174 and re-shaped by the pre-amplifier 177, the post-amplifier 179, and the discriminator 181 and the reception is completed.

According to this embodiment, even if receiving devices are not provided for the number of wavelengths, a plurality of wavelengths can be selected and received, so that the embodiment is economical. If many wavelengths are used, the service can be provided with a most suitable signal format for each wavelength and the analog signal format or the digital signal format can be selected freely. Furthermore, many services are not packed into one wavelength and the signal band per each wavelength can be suppressed to a small one, so that long distance transmission can be made possible by restricting the band of a receiver and increasing the sensitivity.

In this embodiment, an example that the wavelength $\lambda 1$ which is shortest among the wavelength multiplexed signals is used as a control signal is explained. When the shortest wavelength is used, three optical detectors are enough and the number of necessary optical detectors is least. There is a realization method using the longest wavelength inversely. In this case, the optical receiving device 173 has four optical detectors, and the optical detector nearest to the reception end absorbs a wavelength shorter than the selected wavelength, and the second nearest optical detector absorbs the selected wavelength, and the third nearest optical detector absorbs a wavelength shorter than the control wavelength, and the fourth nearest optical detector absorbs the control wavelength. The control wavelength is a longest wavelength, so that it passes all the optical detectors on the way.

If the control wavelength is neither longest nor shortest, six optical detectors are necessary in total, such as two to select a wavelength shorter than the control wavelength, two to receive only the control wavelength, and two to select a wavelength longer than the control wavelength.

Embodiment 10

Furthermore, an example of the constitution that one terminal in the ring network is used as a parent station for assigning a wavelength in Embodiment 10 will be explained by referring to FIG. 10.

A difference of this constitution example from that of Embodiment 9 shown in FIG. 9 is that the wavelength selection signal generator 187 in each terminal has a function for controlling not only the bias tuning circuits 183 and 184 but also the bias tuning circuit 169 for the optical emitter No. 1 164.

A case that the parent station is assigned to the terminal 142 and the child station terminal 141 sends a signal to the child station terminal 143 will be considered. Firstly, it is notified to the terminal 142 which is a parent station by the control signal transmission wavelength $\lambda 1$ that a signal transmission request to the terminal 143 from the terminal 141 occurs. The terminal which is a parent station selects one from wavelengths which are not used in the network and notifies the wavelength to the terminals 141 and 143 using the control signal transmission wavelength λ1. The transmitted wavelength is defined as λ2 hereafter. The wavelength selection signal generator 187 in the terminal 141 controls the bias tuning circuit, allows the optical emitter No. 1 to emit light with a wavelength of λ2, and sends the signal. On the other hand, the wavelength selection signal generator 187 in the terminal 143 controls the bias tuning circuits 183 and 184, allows the optical detector No. 2 to absorb wavelengths which are larger than the wavelength λ2 and to pass the wavelength λ2 at the same time, and allows the optical detector No. 1 to absorb the wavelength λ2. By doing this, the signal with a wavelength of λ2 is sent to the user at the terminal 143.

According to this embodiment, the number of wavelengths to be multiplexed can be linked at the same time in the network, so that in addition to the effect described in Embodiment 9, the capacity per link can be increased.

The entire disclosure of Japanese Patent Application No. 8-154351 filed on Jun. 14, 1996 including specification, claims, drawings and summary are incorporated herein by reference in its entirety.

What is claimed is:

1. An optical transmission equipment for sending and receiving an optical signal in time division via an optical fiber, wherein said optical transmission equipment comprises a combination of an optical transmission device for emitting light with a desired wavelength (λ1) and sending transmission information to said optical fiber by said light and an optical receiving device for receiving reception information of light with the same wavelength (λ1) as said desired wavelength, concatenates said optical transmission device and said optical receiving device on the same optical axis in the order of said optical transmission device and said optical receiving device beginning from the side of said optical fiber, and furthermore has a driver circuit for driving said optical transmission device and a bias tuning circuit for supplying a bias voltage for tuning the band gap of said optical transmission device via said driver circuit and electrically tuning and controlling said desired wavelength (λ1) emitted from said optical transmission device, and said bias tuning circuit sets so that transmitted light with said desired wavelength (λ1) is outputted to said optical fiber from said optical transmission device during optical transmission and sets so that received lights with the same wavelength as said wavelength supplied via said optical fiber and a wavelength (λ2, λ3) longer than said wavelength are led to said optical receiving device during optical reception.

2. An optical transmission equipment according to claim 1, wherein wavelength light emitted from said optical transmission device is received by said optical receiving device during optical transmission and said optical receiving device is used as a monitor element for transmitted light power.

3. An optical transmission equipment according to claim 1, wherein furthermore, said optical transmission equipment has a circuit for controlling said driver circuit so as to absorb a part of wavelength light emitted from said optical transmission device by said optical receiving device, convert said absorbed light to an electric signal, and make the optical power of said optical transmission device constant by said electric signal.

4. An optical transmission equipment according to claim 1, wherein said optical transmission device and said optical receiving device are formed on the same semiconductor substrate.

5. An optical transmission equipment for sending and receiving optical signals which are time division multiplexed or wavelength multiplexed and have the same wavelength, wherein said equipment has an optical transmission device which is connected to said optical fiber and emits an optical signal having a first wavelength, an optical receiving device which is concatenated to said optical transmission device and receives an optical signal having said first wavelength (λ1), a driver circuit for setting and driving a band gap of said optical transmission device at a desired bias voltage, and a bias tuning circuit for tuning said bias voltage, and said equipment has another optical receiver which is connected to said optical receiving device and receives an optical signal having a second wavelength (λ2) longer than said first wavelength and a control circuit for converting said optical signal having said first wavelength received by said optical receiving device to an electric signal and controlling so that the transmitted light power of said optical transmission device is made constant via said driver circuit, and at least one of said emitted wavelength and said detected wavelength can be tuned.

6. An optical transmission equipment according to claim 5, wherein when an optical signal is sent to said optical fiber from said optical transmission device, said bias voltage is set so that said optical transmission signal having said first wavelength is emitted from said optical transmission device and when said optical signal having said first wavelength supplied to said optical fiber is received via said optical transmission device, said bias voltage sets a band gap of said optical transmission device so as to pass said optical signal having said first wavelength.

7. An optical transmission equipment according to claim 5, wherein said optical transmission device and said optical receiving device are formed on the same semiconductor substrate.

* * * * *